UNITED STATES PATENT OFFICE.

WILLIAM A. FORCE, OF BROOKLYN, NEW YORK.

COMPOSITION FOR STEREOTYPE-PLATES.

SPECIFICATION forming part of Letters Patent No. 483,716, dated October 4, 1892.

Application filed October 1, 1891. Serial No. 407,390. (No specimens.)

*To all whom it may concern:*

Be it known that I, WILLIAM A. FORCE, a citizen of the United States, residing at Brooklyn, in the county of Kings and State of New York, have invented a new and useful Improvement in Compositions for Stereotype-Plates, &c., of which the following is a specification.

My invention relates to a new compound or composition of matter adapted for use in making stereotype-plates, hand-stamp plates of type, and similar articles, especially where plates of small size are required from which only an average number of impressions are to be taken in work—such, for instance, as is done by job-printers.

In my improved composition for printing-plates I make use of rubber, sulphur, and plumbago, together with a body of earthy material, such as white lead and litharge, and to this baryta or zinc may be added to harden the same.

The rubber that I employ is the pure native gum or caoutchouc after it has been washed and cleansed. These ingredients I prefer to employ in about the following proportions or quantities: of rubber, about two and a half pounds; of plumbago, white lead, and litharge, about four pounds two and a half ounces each; of sulphur, about six or seven ounces; of baryta, when employed with the before-named ingredients, about three or four pounds, and of zinc about three pounds two ounces, with about one pound one ounce of plumbago instead of the before-mentioned quantity. I compound and prepare these ingredients and form therefrom the stereotype-plates in substantially the following manner:

The ingredients in about the proportion named are all thoroughly mixed and ground up together in any suitable grinding-machine. The mass thus formed is now to be rolled out into sheets between hot rolls, when it will assume a flexible elastic condition, in which it will remain a long time. This sheet is to be cut up, as required, into sizes corresponding to the type-form to be used in making the stereotype-plate.

The usual plaster mold used in making stereotype-plates is employed in my case, and in this plaster mold the sheet of composition is placed and is subjected to pressure and heat sufficient to cause the composition to flow or soften into all the interstices of the mold, and when a certain heat—say 250° to 300°— is reached and maintained for a period the whole composition becomes thoroughly vulcanized and hard, with a perfect type-face for printing.

The composition containing rubber, plumbago, white lead, litharge, and sulphur when vulcanized in the mold produces a stereotype-plate that is sufficiently hard and admirably adapted to put in a press and print from all ordinary work; but said composition is not well adapted or hard enough to take on all the fine lines of small type or engravings in the finest character of work, and it is therefore to adapt my composition to these requirements that I use zinc or baryta, or both, in about the proportion heretofore named. My improved composition containing zinc and baryta in the proportions named becomes very hard, but not brittle, in vulcanizing, and the same is adapted for a stereotype-plate for the finest class of work and a great many impressions can be taken from it. The litharge and white lead form the body of the composition, and when used together in about the proportions specified I find the composition the best for the purpose. The plumbago spreads with uniformity upon the body material and fills interstices and lessens the tendency to adhere to the mold, the rubber forms the cementing material, and the sulphur combines with the rubber in the vulcanizing operation, so that the sheet is well adapted to the intended use.

My improved composition can be purchased by printers in the sheet form and be used by them in making stereotype-plates, and it possesses, among other advantages, that of saving wear and tear of type, of preserving the form for future use, and it allows the type to be in constant use in setting up new forms from which other stereotype-plates are made.

Such stereotype-plates as are now employed for rubber stamps and kindred articles can be made with facility from my improved composition.

I claim as my invention—

1. The composition herein set forth for forming stereotype-plates, the same consisting of rubber, plumbago, white lead, litharge, and sulphur, substantially as specified.

2. The composition herein set forth for forming stereotype-plates, the same consisting of rubber, plumbago, white lead, litharge, and sulphur in about the proportion of two and a half pounds of rubber, four pounds two and a half ounces each of plumbago, white lead, and litharge, and six ounces of sulphur, substantially as specified.

3. The composition herein set forth for forming stereotype-plates, the same consisting of rubber, plumbago, white lead, litharge, zinc, baryta, and sulphur, substantially as specified.

4. The composition herein set forth for printing-plates, composed of a body such as litharge, white lead, baryta or zinc, and plumbago, rubber, and sulphur, substantially as specified.

Signed by me this 29th day of September, 1891.

WM. A. FORCE.

Witnesses:
GEO. T. PINCKNEY,
HAROLD SERRELL.